United States Patent
Wei et al.

(10) Patent No.: US 11,626,984 B2
(45) Date of Patent: Apr. 11, 2023

(54) BLOCKCHAIN INTEGRATED STATION AND CRYPTOGRAPHIC ACCELERATION CARD, KEY MANAGEMENT METHODS AND APPARATUSES

(71) Applicant: ALIPAY (HANGZHOU) INFORMATION TECHNOLOGY CO., LTD., Zhejiang (CN)

(72) Inventors: Changzheng Wei, Hangzhou (CN); Peng Wu, Hangzhou (CN); Ying Yan, Hangzhou (CN); Hui Zhang, Hangzhou (CN); Changhua He, Hangzhou (CN); Zongru Zhan, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,598

(22) Filed: Jun. 29, 2021

(65) Prior Publication Data
US 2021/0328786 A1   Oct. 21, 2021

(30) Foreign Application Priority Data
Jul. 8, 2020   (CN) .......................... 202010652962.0

(51) Int. Cl.
*H04L 9/08* (2006.01)
*H04L 9/32* (2006.01)

(52) U.S. Cl.
CPC .......... *H04L 9/0861* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 2005/0180572 A1* | 8/2005 | Graunke ............... | H04L 9/0891 380/277 |
| 2014/0215066 A1* | 7/2014 | Kamat ................... | H04L 63/08 709/225 |
| 2019/0312719 A1 | 10/2019 | Cheon et al. | |
| 2020/0294011 A1* | 9/2020 | Robertson ............. | H04L 9/3255 |

(Continued)

FOREIGN PATENT DOCUMENTS

| | | |
|---|---|---|
| CN | 106452771 A | 2/2017 |
| CN | 108075882 A | 5/2018 |
| CN | 108648079 | 10/2018 |

(Continued)

OTHER PUBLICATIONS

Asif, R., et al., 2020. Proof-of-PUF enabled blockchain: Concurrent data and device security for internet-of-energy. Sensors, 21(1), p. 28. (Year: 2020).*

(Continued)

*Primary Examiner* — Luu T Pham
*Assistant Examiner* — Edward X Long
(74) *Attorney, Agent, or Firm* — Fish & Richardson P.C.

(57) ABSTRACT

A cryptographic acceleration card generates, using an attribute unique to a blockchain integrated station that comprises the cryptographic acceleration card, an identity private key for the blockchain integrated station. The cryptographic acceleration card generates a private key ciphertext by encrypting the identity private key. The cryptographic acceleration card stores the private key ciphertext.

19 Claims, 3 Drawing Sheets

(56) References Cited

U.S. PATENT DOCUMENTS

2020/0412521 A1* 12/2020 Shi .................. G06Q 20/308

FOREIGN PATENT DOCUMENTS

| CN | 109344632 | 2/2019 |
| CN | 109359979 | 2/2019 |
| CN | 109510820 | 3/2019 |
| CN | 110011801 | 7/2019 |
| CN | 110213058 | 9/2019 |
| CN | 110245466 | 9/2019 |
| CN | 110278071 | 9/2019 |
| CN | 110740130 | 1/2020 |
| CN | 110765438 A | 2/2020 |
| CN | 110881063 | 3/2020 |
| CN | 111342963 | 6/2020 |
| WO | 2020082020 A1 | 4/2020 |

OTHER PUBLICATIONS

Javaid, U. et al.,2020. Ascalable protocol for driving trust management in internet of vehicles with blockchain. IEEE Internet of Things Journal, 7(12), p. 11815-11829. (Year: 2020).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Appln. No. 21182240.8, dated Dec. 1, 2021, 10 pages.
Islam et al., "Enabling IC Traceability via Blockchain Pegged to Embedded PUF," ACM Transactions on Design Automation of Electronic Systems, Jun. 1, 2019, 24(3): 1-23.
wikipedia.org [online], "Physical unclonable function," Jun. 3, 2020, retrieved on Oct. 25, 2021, retrieved from URL <https://en.wikipedia.org/w/index.php?title=Physical_unclonable_function&oldid=960473367>, 8 pages.

* cited by examiner

BLOCKCHAIN INTEGRATED STATION AND CRYPTOGRAPHIC ACCELERATION CARD, KEY MANAGEMENT METHODS AND APPARATUSES

CROSS-REFERENCE TO RELATED APPLICATIONS

The application claims priority to Chinese Patent Application No. 202010652962.0, filed on Jul. 8, 2020, which is hereby incorporated by reference in its entirety.

TECHNICAL FIELD

The present disclosure relates to the field of terminal technologies, and in particular to a blockchain integrated station, and a cryptographic acceleration card, key management methods and apparatuses.

BACKGROUND

Blockchain technology (also called distributed ledger technology) is a decentralized distributed database technology having many characteristics such as decentralization, openness, transparency, immutability and trustability, and thus it is applicable to many application scenarios with high demands for data reliability.

SUMMARY

In view of this, one or more embodiments of the present disclosure provide a blockchain integrated station and a cryptographic acceleration card, key management methods and apparatuses.

In order to achieve the above object, one or more embodiments of the present disclosure provide the following technical solution:

According to a first aspect of one or more embodiments of the present disclosure, provided is a cryptographic acceleration card used for a blockchain integrated station, including:

a key generating module, configured to generate an identity key for the blockchain integrated station, wherein the identity key includes an identity private key and an identity public key;

an encrypting and decrypting module, configured to be connected to the key generating module to encrypt the identity private key into a corresponding private key ciphertext for storage.

According to a second aspect of one or more embodiments of the present disclosure, provided is a blockchain integrated station, where the cryptographic acceleration card according to the first aspect is assembled on the blockchain integrated station.

According to a third aspect of one or more embodiments of the present disclosure, provided is a key management method of a blockchain integrated station. The method is applied to a cryptographic acceleration card assembled on the blockchain integrated station, and comprises:

generating an identity key of the blockchain integrated station, where the identity key includes an identity private key and an identity public key;

encrypting the identity private key into a corresponding private key ciphertext;

storing the private key ciphertext.

According to a fourth aspect of one or more embodiments of the present disclosure, provided is a key management apparatus of a blockchain integrated station. The apparatus is applied to a cryptographic acceleration card assembled on the blockchain integrated station, and comprises:

a key generating module, configured to generate an identity key for the blockchain kiosk, wherein the identity key includes an identity private key and an identity public key;

an encrypting and decrypting module, configured to encrypt the identity private key into a corresponding private key ciphertext;

a storing module, configured to store the private key ciphertext.

According to a fifth aspect of one or more embodiments of the present disclosure, provided is a cryptographic acceleration card, including:

a processor;

a memory for storing processor executable instructions;

where the processor implements the methods according to the third aspect by running the executable instructions.

According to a sixth aspect of one or more embodiments of the present disclosure, provided is a computer readable storage medium having computer instructions stored thereon, where the instructions are executed by a processor to implement steps in the method according to the third aspect.

DETAILED DESCRIPTION OF THE EMBODIMENTS

Figure 1:
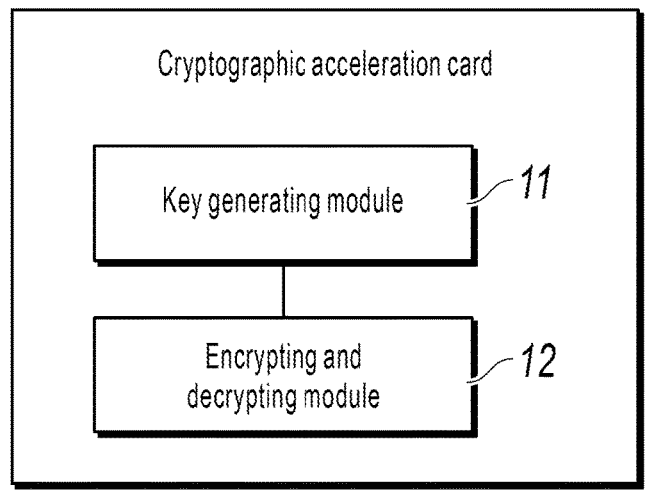
FIG. 1 is a block diagram of a cryptographic acceleration card used for a blockchain integrated station according to example embodiments of the present disclosure.

Example embodiments will be described in detail herein with the example embodiments thereof expressed in the drawings. When the following descriptions involve the drawings, same numbers in different drawings represent same or similar elements unless stated otherwise. The implementations described in the following example embodiments do not represent all implementations consistent with one or more examples of the present disclosure. On the contrary, they are merely example embodiments of apparatuses and methods consistent with some aspects of one or more examples of the present disclosure described in detail in the appended claims.

It should be noted that the steps in corresponding method is not necessarily performed according to the sequence shown in the present disclosure in other examples. In some other examples, the steps included in the corresponding method can be more or less than described in the specification. Further, a single step described in the specification can be divided into several steps for descriptions in other examples while several steps described in the specification can be combined into a single step for descriptions in other examples.

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to participate in the blockchain network are autonomous and the users also need to perform autonomous maintenance, for example, perform maintenance and configuration and so on for their devices, for example, PC, participating in the blockchain network. Along with continuous development of the blockchain technology, especially along with increasing needs of users for infrastructures with high performance and high availability, the blockchain network develops into 2.0 architecture era based on cloud service. In the 2.0 architecture era, Blockchain-as-a-Service (BaaS) provides fast and convenient solutions for fast blockchain deployment and technical implementation and supports a large number of blockchain service projects. Generally, BaaS is built on infrastructures such as public cloud or private cloud, which introduces heavy dependence on infrastructure as well as providing strong deployment capability. However, because blockchain is a typical distributed computing technology, not all nodes can be migrated to clouds but privatization deployment is needed. The additional technical migration and maintenance costs brought by the privatization deployment cause inconsistent technical interfaces and high deployment and maintenance costs during an actual implementation. Therefore, to satisfy the needs of users for privatization and security and the like of the blockchain network, further architecture upgrade needs to be performed to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimization of the hardware devices integrated into the blockchain integrated station, thereby realizing the above software-hardware integration.

Software optimization can be realized for the blockchain integrated station. For example, a certification authorization service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. In addition to quickly establishing a private blockchain network between a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like) and the like.

Hardware optimization can be realized for the blockchain integrated station. For example, a dedicated smart contract processing chip can be deployed on the blockchain integrated station. For example, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know an identity public key corresponding to the hardware root-of-trust key (for example, the identity public key is disclosed). Therefore, the smart contract processing chip can send negotiation information to the provider and sign the negotiation information by using the hardware root-of-trust key, so that the provider can verify the signature based on the corresponding identity public key; and, after successful signature verification, it is ensured that the smart contract processing chip and the provider obtain the same key through negotiation based on the above negotiation information. The negotiated key can include a file deployment key, and thus the provider can encrypt and transmit a binary image file needed by a blockchain node to the smart contract processing chip based on the file deployment key, and the smart contract processing chip can decrypt and deploy the binary image file based on the file deployment key. The negotiated key can include a service secret deployment key, and thus the provider can encrypt and transmit a node private key of the blockchain node, a service root key of the blockchain node, etc., to the smart contract processing chip based on the service secret deployment key, and the smart contract processing chip can obtain and deploy the node private key and the service root key and the like based on the service secret deployment key to satisfy the privacy transaction needs in a blockchain scenario. For example, the node private key corresponds to a node public key, and thus a client device can perform encrypted transmission for a blockchain transaction by using the node public key, and the blockchain node can perform decryption through the node private key. The service root key is a symmetric key which can be used to perform encrypted storage for service data such as contract codes and value of contract status and the like. The service root key may not be directly used, and the smart contract processing chip can perform encryption and decryption through a derivation key of the service root key to reduce the security risk of the service root key. Through reliable management for the node private key and the service root key (or its derivation key), data will be always in encrypted state unless processed by the smart contract processing chip. Therefore, the smart contract processing chip actually forms a Trusted Execution Environment (TEE) of hardware on the blockchain integrated station, so as to ensure the data requiring privacy protection such as transactions, contract codes, and contract status will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so the CPU can process more computation-intensive operations, for example, transaction processing, and storage processing and the like. Compared with other components, for example, CPU, on the blockchain integrated station, the intelligent network card is closer to the network regardless of physical level or logical level, so that the intelligent network card can always fetch data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not required to directly participate in the consensus process, thereby significantly improving the consensus efficiency. Similarly, the same effect can be achieved in forwarding transactions by the intelligent network card and achieving block synchronization by the intelligent network card on a newly-added blockchain node and the like and will not be repeated herein. Furthermore, after receiving transactions, the intelligent network card can identify or filter out a replay transaction by comparing the received transaction with historical transactions, for example, comparing data fields of sender information of transaction, destination address, time stamp, and hash value and the like. The intelligent network card can also perform content analysis for those received transactions, so as to filter out illegal transactions or predefined undesired transactions and the like as a supplementation to layer-2 or layer-3 packet filtering implemented by a switch.

For another example, a cryptographic acceleration card which is also called a high speed cryptographic card can be deployed on the blockchain integrated station. The hardware roof-of-trust key as described above can be maintained in the cryptographic acceleration card, and the cryptographic acceleration card can perform signature operation based on the hardware roof-of-trust key and replace or assist the smart contract processing chip to complete the operations such as the key negotiation as described above. Similarly, the cryptographic acceleration card can be used to maintain an identity public key so that the cryptographic acceleration card can realize signature verification operation based on the maintained identity public key. In short, at least part of operations relating to key management, encryption and decryption, and signature verification and the like on the blockchain integrated station can be handed over to the cryptographic acceleration card, so that very high security can be realized and performance offloading can be realized for the CPU of the blockchain integrated station or the above smart contract processing chip, thereby improving the processing efficiency.

FIG. 1 is a block diagram of a cryptographic acceleration card used for a blockchain integrated station according to example embodiments of the present disclosure. The cryptographic acceleration card can include a key generating module 11, and an encrypting and decrypting module 12, where an output end of the key generating module 11 is in electrical connection with the encrypting and decrypting module 12. The key generating module 11 is configured to generate an identity key for the blockchain integrated station, and the identity key includes an identity private key and an identity public key. The encrypting and decrypting module 12 is configured to encrypt the identity private key output by the key generating module 11 into a corresponding private key ciphertext for storage.

Because the identity private key needs to be safely kept, encrypting the identity private key into the private key ciphertext for storage can reduce the risk of leakage of the identity private key, thereby ensuring the security of the identity private key. Of course, the identity public key can also be encrypted. But, the encryption for the identity public key is not necessary because it can be disclosed.

For generation of the identity key, the key generating module can generate the identity key according to hardware feature data of the blockchain integrated station. The hardware feature data can be difference data caused by deviation of random process in a manufacturing process of the blockchain integrated station. The data is unique and unclonable. Because the hardware feature data of the blockchain integrated station is unpredictable, unique, and unclonable, generation of the identity key based on the hardware feature data of the blockchain integrated station has a high level of security in the embodiments.

In an embodiment, if the blockchain integrated station includes a master control chip, the hardware feature data of the blockchain integrated station can be hardware feature data of the master control chip. A deep sub-micron random difference between different master control chips can be generated due to process deviation in a manufacturing and packaging process of different master control chips. Unique and unclonable hardware feature data can be obtained by sampling such random difference.

In another embodiment, if a smart contract processing chip is deployed on the blockchain integrated station, the hardware feature data of the blockchain integrated station can be hardware feature data of the smart contract processing chip. Similarly, a deep sub-micron random difference between different smart contract processing chips can be generated due to process deviation in a manufacturing and packaging process of different smart contract processing chips. Unique and unclonable hardware feature data can be obtained by sampling such random difference.

In another embodiment, if an intelligent network card is deployed on the blockchain integrated station, the hardware feature data of the blockchain integrated station can be hardware feature data of the intelligent network card. Similarly, a deep sub-micron random difference between different intelligent network cards can be generated due to process deviation in a manufacturing and packaging process of different intelligent network cards. Unique and unclonable hardware feature data can be obtained by sampling such random difference.

In another embodiment, the hardware feature data of all or part of the master control chip, the smart contract processing chip, and the intelligent network card and the like included in the blockchain integrated station can be combined and the combined hardware feature data is taken as the hardware feature data of the blockchain integrated station.

It should be noted that the hardware feature data usually includes a plurality of feature parameters, for example, size of a chip, difference generated by electric property, random distribution value of a memory upon initialization of the memory, electric current under power-down mode, receiving sensitivity and data transmission rate and the like. Some of these feature parameters are stable and their values will not change. Other feature parameters are unstable and their values may change. In this embodiment, all or part of the stable feature parameters are selected as the feature parameters for generating the identity key.

In another embodiment, the cryptographic acceleration card can further include a collecting module. When the cryptographic acceleration card includes the collecting module, the collecting module can be triggered to collect and output the hardware feature data to the key generating module in response to receiving a key generation request, so that the key generating module is triggered to generate the identity key of the blockchain integrated station according to the hardware feature data. The key generation request can be generated based on at least one of the followings including but not limited to: generated based on a generation request of a hardware root-of-trust key; generated based on an identity verification request of the blockchain integrated station; and generated based on a request to store a transaction in a blockchain.

In another embodiment, the cryptographic acceleration card can further include a receiving module. The receiving module is configured to receive the hardware feature data collected by the blockchain integrated station and output the hardware feature data to the key generating module, such that the key generating module is triggered to generate the identity key of the blockchain integrated station based on the hardware feature data.

For encryption of the identity private key, the encrypting and decrypting module can adopt a symmetric encryption algorithm or an asymmetric encryption algorithm. The symmetric encryption algorithm can include but not limited to DES algorithm, 3DES algorithm, IDEA algorithm, AES algorithm, TDEA algorithm, Blowfish algorithm, and RC5 algorithm and the like (the above are all symmetric encryption algorithms). The asymmetric encryption algorithm includes but not limited to RSA algorithm, Elgamal algorithm, backpack algorithm, Rabin algorithm, D-H algorithm, and ECC algorithm and the like (the above are all asymmetric encryption algorithms). If the asymmetric encryption algorithm is adopted to encrypt the identity private key, the private key to be encrypted can be obtained from outside the cryptographic acceleration card or the private key generated by the cryptographic acceleration card is used.

In an embodiment, the cryptographic acceleration card can further include a storing module. The encrypting and decrypting module 12 can output the private key ciphertext to the storing module for storage. When the blockchain integrated station needs to use the identity private key, the encrypting and decrypting module 12 can obtain and decrypt the private key ciphertext based on a decryption algorithm corresponding to the encryption algorithm.

The storing module can be but not limited to a one time programmable (OTP) memory for which only one programming operation can be performed, that is, the private key ciphertext is not allowed to be modified after being programmed into the OTP memory, thereby preventing an attack device from tampering with the private key ciphertext in the OTP memory. Thus, the security of the identity key is further improved.

In another embodiment, the encrypting and decrypting module can also output the private key ciphertext to a storage space outside the cryptographic acceleration card for storage. When the blockchain integrated station needs to use the identity private key, the encrypting and decrypting module 12 obtains the private key ciphertext from the external storage space and decrypts the private key ciphertext based on the decryption algorithm corresponding to the encryption algorithm. The cryptographic acceleration card does not directly output the identity private key but encrypts the identity private key into the private key ciphertext and then outputs it for storage, thereby reducing the risk of stealing or tampering of the identity private key.

In another embodiment, the key generating module 11 can also output the generated identity public key to the storing module included in the cryptographic acceleration card for storage, or output the generated identity public key to the storage space outside the cryptographic acceleration card for storage.

In any of the above embodiments, the cryptographic acceleration card does not directly store the identity private key of the blockchain integrated station nor output the identity private key of the blockchain integrated station externally, but stores and outputs the private key ciphertext obtained by encrypting the identity private key, thereby disabling an attack device from obtaining the identity private key of the blockchain integrated station. In this way, the risk of leakage of the identity private key of the blockchain integrated station is effectively prevented and the security of the identity private key is effectively guaranteed.

Figure 2:
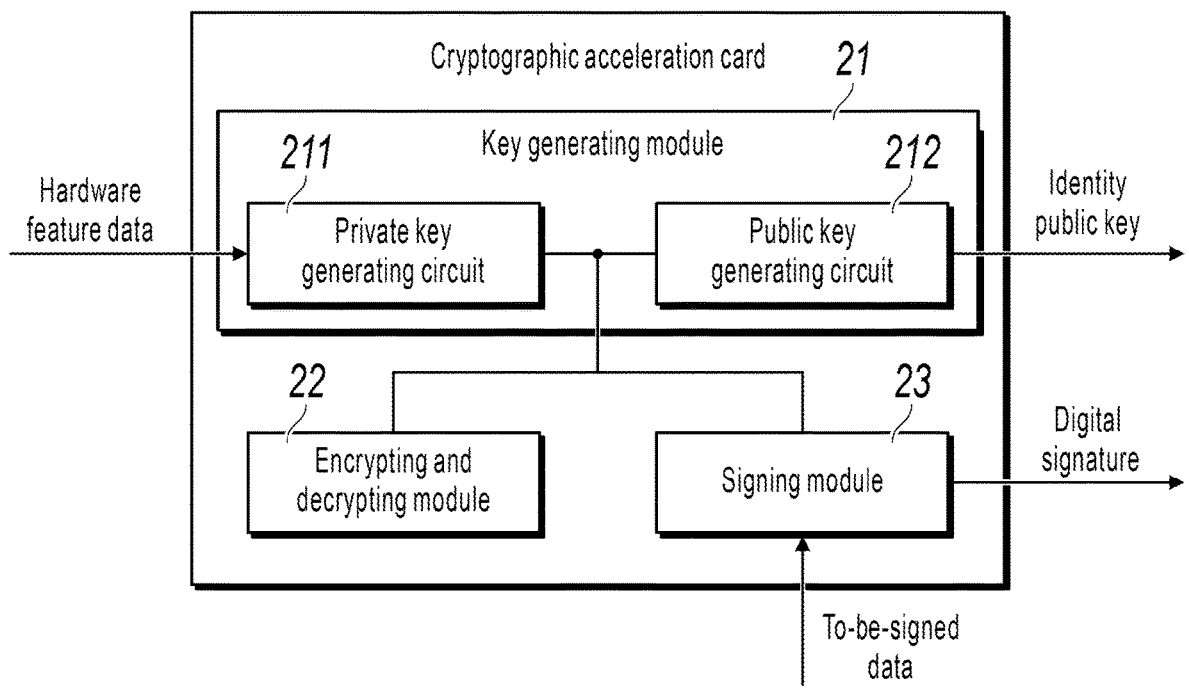
FIG. 2 is a block diagram of another cryptographic acceleration card used for a blockchain integrated station according to example embodiments of the present disclosure.

FIG. 2 is a block diagram of another cryptographic acceleration card used for a blockchain integrated station according to example embodiments of the present disclosure. The cryptographic acceleration card can include a key generating module 21, an encrypting and decrypting module 22 and a signing module 23. The key generating module 21 is configured to generate an identity key of the blockchain integrated station based on the hardware feature data of the blockchain integrated station, where the identity key includes an identity private key and an identity public key. The encrypting and decrypting module 22 is configured to encrypt the identity private key output by the key generating module 21 into a corresponding private key ciphertext for storage. The signing module 23 is configured to call the encrypting and decrypting module 22 to decrypt the private key ciphertext and sign to-be-signed data provided by the blockchain integrated station according to the identity private key obtained by decryption.

As a result, the cryptographic acceleration card can complete operations relating to key management, encryption and decryption, signature verification and the like on the blockchain integrated station. In this way, very high security can be realized and task offloading can be realized for the CPU of the blockchain integrated station or the above smart contract processing chip, thereby improving the processing efficiency.

The hardware feature data in this embodiment can be difference data caused by deviation of random process in a manufacturing process of the blockchain integrated station. The data is unique and unclonable. Because the hardware feature data of the blockchain integrated station is unpredictable, unique, and unclonable, generation of the identity key based on the hardware feature data of the blockchain integrated station has a high level of security in the embodiments.

In an embodiment, the cryptographic acceleration card can further include a collecting module. When the cryptographic acceleration card includes the collecting module, the collecting module can be triggered to collect and output the hardware feature data to the key generating module in response to receiving a key generation request, such that the key generating module is triggered to generate the identity key of the blockchain integrated station according to the hardware feature data.

In another embodiment, the cryptographic acceleration card can further include a receiving module. The receiving module is configured to receive the hardware feature data collected by the blockchain integrated station, and output the hardware feature data to the key generating module, such that the key generating module is triggered to generate the identity key of the blockchain integrated station according to the hardware feature data.

As shown in FIG. 2, the key generating module 21 includes a private key generating circuit 211, and a public key generating circuit 212. An input end of the private key generating circuit 211 is used to receive the hardware feature data of the blockchain integrated station and an output end of the private key generating circuit 211 is connected with an input end of the public key generating circuit 212.

The private key generating circuit 211 can convert the input hardware feature data into an identity private key, and output the identity private key to the public key generating circuit 212 to trigger the public key generating circuit 212 to convert the identity private key into an identity public key for outputting.

The private key generating circuit can be implemented by using a Physical Unclonable Function (PUF) circuit and the like. The public key generating circuit can be implemented by using an asynchronous circuit having an Elliptic Curve Cryptography algorithm function and the like.

The output end of the private key generating circuit 211 can also be connected with an input end of the encrypting and decrypting module 22. The encrypting and decrypting module 22 can encrypt the identity private key into a corresponding private key ciphertext for storage. If the cryptographic acceleration card includes a storing module (not shown), the encrypting and decrypting module 22 can output the private key ciphertext to the storing module for storage. The storing module can be, but not limited to a one time programmable (OTP) memory. The encrypting and decrypting module 22 can also output the private key ciphertext to a storage space outside the cryptographic acceleration card for storage. The encrypting and decrypting module can encrypt the identity private key by using a symmetric encryption algorithm or an asymmetric encryption algorithm.

If the encrypting and decrypting module 22 stores the private key ciphertext to the storing module included in the cryptographic acceleration card, the encrypting and decrypting module 22 obtains the private key ciphertext from the storing module and decrypts the private key ciphertext based on a decryption algorithm corresponding to the encryption algorithm in response to being called by the signing module 23, such that the signing module 23 signs the to-be-signed data provided by the blockchain integrated station according to the identity private key obtained by decryption.

If the encrypting and decrypting module 22 stores the private key ciphertext to the storage space outside the cryptographic acceleration card, the encrypting and decrypting module 22 obtains the private key ciphertext from the external storage space and decrypts the private key ciphertext based on a decryption algorithm corresponding to the encryption algorithm in response to being called by the signing module 23, such that the signing module 23 signs the to-be-signed data provided by the blockchain integrated station according to the identity private key obtained by decryption.

The to-be-signed data can be but not limited to negotiation information and blockchain transaction and the like.

In another embodiment, the output end of the private key generating circuit 211 can also be connected with an input end of the signing module 23. Thus, the private key generating circuit 211 outputs the generated identity private key directly to the signing module 23 such that the signing module 23 signs the to-be-signed data provided by the blockchain integrated station according to the received identity private key.

In this embodiment, the private key generating circuit generates the identity private key which is unique and unclonable according to the hardware feature data and outputs the identity private key to at least one of the public key generating circuit, the encrypting and decrypting module, and the signing module, rather than outputs the identity private key to outside of the cryptographic acceleration card, thereby preventing the identity private key from being stolen. Because the cryptographic acceleration card is implemented by a hardware circuit, after the identity private key is generated, the identity private key can be erased when the cryptographic acceleration card is powered off and the identity private key cannot be read from the cryptographic acceleration card. In this case, an attack device cannot steal the identity private key from the cryptographic acceleration card, and side channel attack can also be defended against by hardware reinforcement, thus having very high security.

Figure 3:
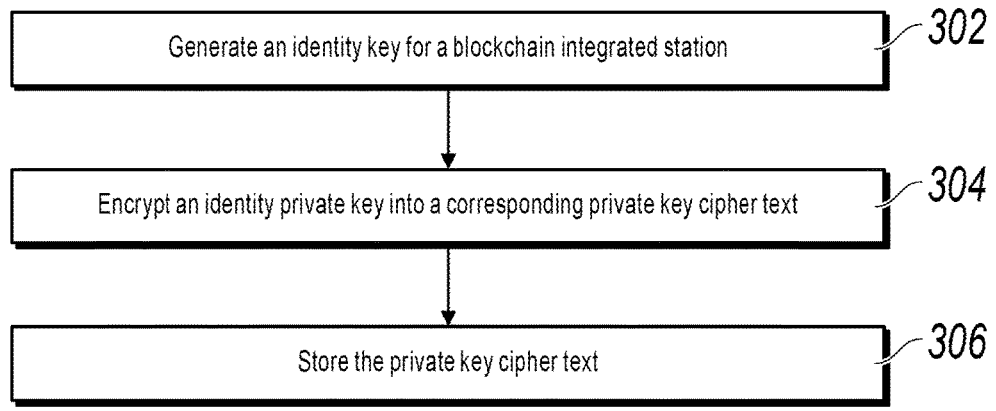
FIG. 3 is a flowchart of a key management method of a blockchain integrated station according to example embodiments of the present disclosure.

FIG. 3 is a flowchart of a key management method of a blockchain integrated station according to example embodiments of the present disclosure. The method is applied to a cryptographic acceleration card assembled on the blockchain integrated station. The method includes the following steps.

At step 302, an identity key of the blockchain integrated station is generated.

The identity key includes an identity private key and an identity public key.

In step 302, the cryptographic acceleration card can obtain hardware feature data of the blockchain integrated station and generate the identity key according to the hardware feature data. The hardware feature data can be difference data caused by deviation of random process in a manufacturing process of the blockchain integrated station. The data is unique and unclonable. Because the hardware feature data of the blockchain integrated station is unpredictable, unique, and unclonable, generation of the identity key based on the hardware feature data of the blockchain integrated station has a high level of security in the embodiments.

In an embodiment, the cryptographic acceleration card can collect the hardware feature data of the blockchain integrated station to generate the identity key according to the hardware feature data in response to receiving a key generation request.

In another embodiment, the blockchain integrated station can collect the hardware feature data itself and then send the collected hardware feature data to the cryptographic acceleration card to trigger the cryptographic acceleration card to generate the identity key according to the hardware feature data.

If the blockchain integrated station includes a master control chip, the hardware feature data of the blockchain integrated station can be hardware feature data of the master control chip. If a smart contract processing chip is deployed on the blockchain integrated station, the hardware feature data of the blockchain integrated station can be hardware feature data of the smart contract processing chip. If an intelligent network card is deployed on the blockchain integrated station, the hardware feature data of the blockchain integrated station can be hardware feature data of the intelligent network card. The hardware feature data of the blockchain integrated station can also be a result of combination of the hardware feature data corresponding to all or part of the master control chip, the smart contract processing chip, and the intelligent network card and the like included in the blockchain integrated station.

It should be noted that the hardware feature data usually includes a plurality of feature parameters, for example, inter-chip device size, difference generated by electric property, memory random distribution value upon initialization, current under power-down mode, receiving sensitivity and data transmission rate and the like. Some of these feature parameters are stable and their values will not change. Other feature parameters are unstable and their values may change. In this embodiment, all or part of the stable feature parameters are selected as the feature parameters for generating the identity key.

At step 304, the identity private key is encrypted into a corresponding private key ciphertext.

Because the identity private key needs to be safely kept, encrypting the identity private key into the private key ciphertext for storage can reduce the risk of leakage of the identity private key, thereby ensuring the security of the identity private key. Of course, the identity public key can also be encrypted. But, the encryption for the identity public key is not necessary because it can be disclosed.

For encryption of the identity private key, the cryptographic acceleration card can adopt a symmetric encryption algorithm or an asymmetric encryption algorithm. The symmetric encryption algorithm can include but not limited to DES algorithm, 3DES algorithm, IDEA algorithm, AES algorithm, TDEA algorithm, Blowfish algorithm, and RC5 algorithm and the like (the above are all symmetric encryption algorithms). The asymmetric encryption algorithm includes but not limited to RSA algorithm, Elgamal algorithm, backpack algorithm, Rabin algorithm, D-H algorithm, and ECC algorithm and the like (the above are all asymmetric encryption algorithms). If the asymmetric encryption algorithm is adopted to encrypt the identity private key, the private key to be encrypted can be obtained from outside the cryptographic acceleration card or the private key generated by the cryptographic acceleration card is used.

At step 306, the private key ciphertext is stored.

In an embodiment, the cryptographic acceleration card can store the private key ciphertext in its internal storage space. When the blockchain integrated station needs to use the identity private key, the cryptographic acceleration card obtains the private key ciphertext from its internal storage space and decrypts the private key ciphertext. For example, if the cryptographic acceleration card receives an identity verification request, it indicates that it might need to perform identity verification for the blockchain integrated station. In this case, the cryptographic acceleration card obtains the private key ciphertext from its internal storage space and decrypts the private key ciphertext, and then signs to-be-signed data provided by the blockchain integrated station according to the identity private key obtained by decryption.

In another embodiment, the cryptographic acceleration card can store the private key ciphertext to a storage space outside the cryptographic acceleration card. When the blockchain integrated station needs to use the identity private key, the cryptographic acceleration card obtains the private key ciphertext from the external storage space and decrypts the private key ciphertext. For example, if the cryptographic acceleration card receives an identity verification request, it indicates that it might need to perform identity verification for the blockchain integrated station. In this case, the cryptographic acceleration card obtains the private key ciphertext from the external storage space and decrypts the private key ciphertext, and then signs the to-be-signed data provided by the blockchain integrated station according to the identity private key obtained by decryption.

In the embodiment, the cryptographic acceleration card does not directly store the identity private key of the blockchain integrated station nor output the identity private key of the blockchain integrated station externally, but stores and outputs the private key ciphertext obtained by encrypting the identity private key, thereby disabling an attack device from obtaining the identity private key of the blockchain integrated station. In this way, the risk of leakage of the identity private key of the blockchain integrated station is effectively prevented and the security of the identity private key is effectively guaranteed.

Figure 4:
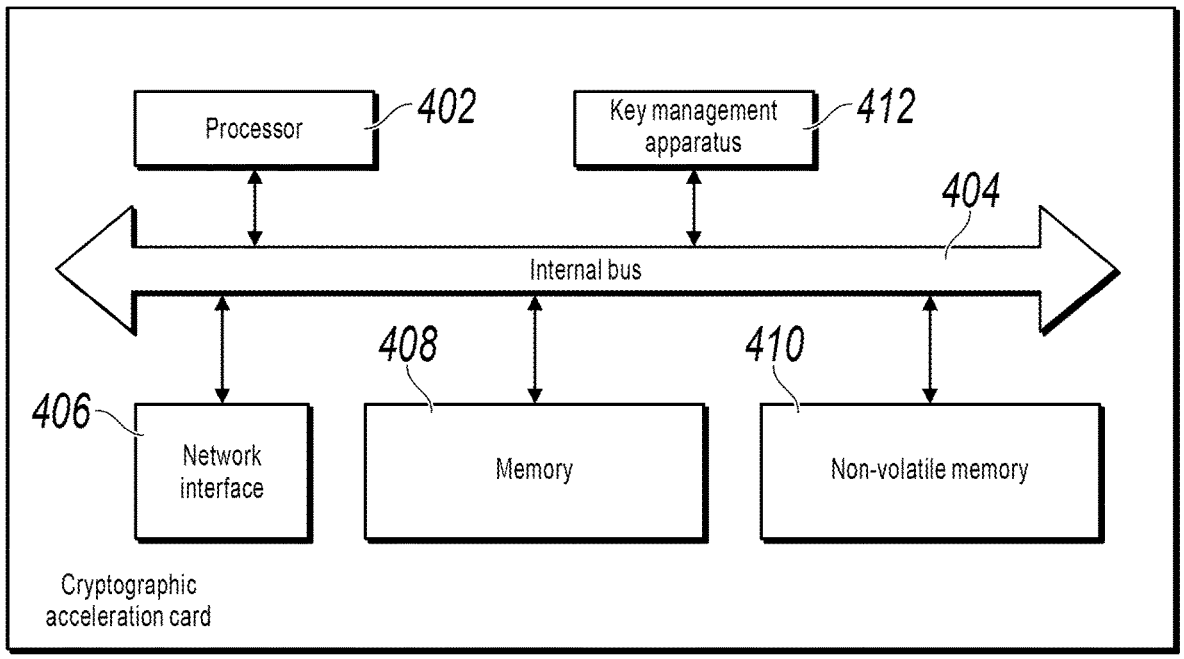
FIG. 4 is a structural schematic diagram of a cryptographic acceleration card according to example embodiments of the present disclosure.

FIG. 4 is a structural schematic diagram of a cryptographic acceleration card according to example embodiments of the present disclosure. With reference to FIG. 4, at the hardware level, the cryptographic acceleration card includes a processor 402, an internal bus 404, a network interface 406, a memory 408, a non-volatile memory 410, and a key management apparatus 412. Of course, the cryptographic acceleration card can also include other hardware needed by services. The key management apparatus 412 is called by the processor 402 to perform operations relating to key management, encryption and decryption, and signature verification and the like.

Figure 5:
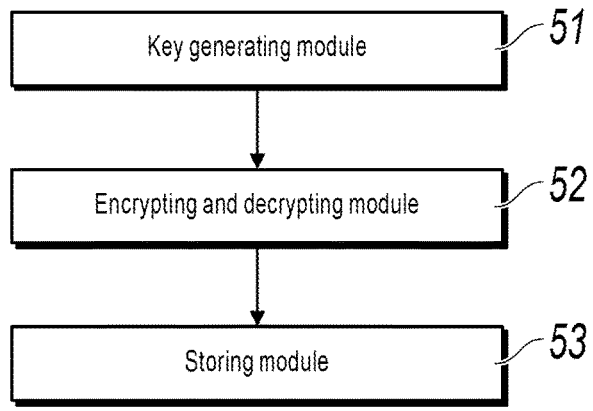
FIG. 5 is a block diagram of a key management apparatus according to example embodiments of the present disclosure.

FIG. 5 is a block diagram of a key management apparatus according to example embodiments of the present disclosure. The apparatus includes:

a key generating module 51, configured to generate an identity key of a blockchain integrated station, where the identity key includes an identity private key and an identity public key;

an encrypting and decrypting module 52, configured to encrypt the identity private key into a corresponding private key ciphertext;

a storing module 53, configured to store the private key ciphertext.

Optionally, the key generating module 51 is specifically configured to:

generate the identity key according to hardware feature data of the blockchain integrated station.

Optionally, the hardware feature data is feature data of a master control chip included in the blockchain integrated station.

Optionally, when generating the identity key according to the hardware feature data of the blockchain integrated station, the key generating module 51 is configured to:

in response to receiving a key generation request, collect the hardware feature data to generate the identity key according to the hardware feature data; or in response to receiving the hardware feature data collected by the blockchain integrated station, generate the identity key according to the hardware feature data.

Optionally, the encrypting and decrypting module is further configured to:

in response to receiving an identity verification request, decrypt the private key ciphertext and sign to-be-signed data provided by the blockchain integrated station according to the identity private key obtained by decryption.

Optionally, the storing module 53 is specifically configured to:

store the private key ciphertext in a storage space inside the cryptographic acceleration card; or store the private key ciphertext in a storage space outside the cryptographic acceleration card.

Figure 6:
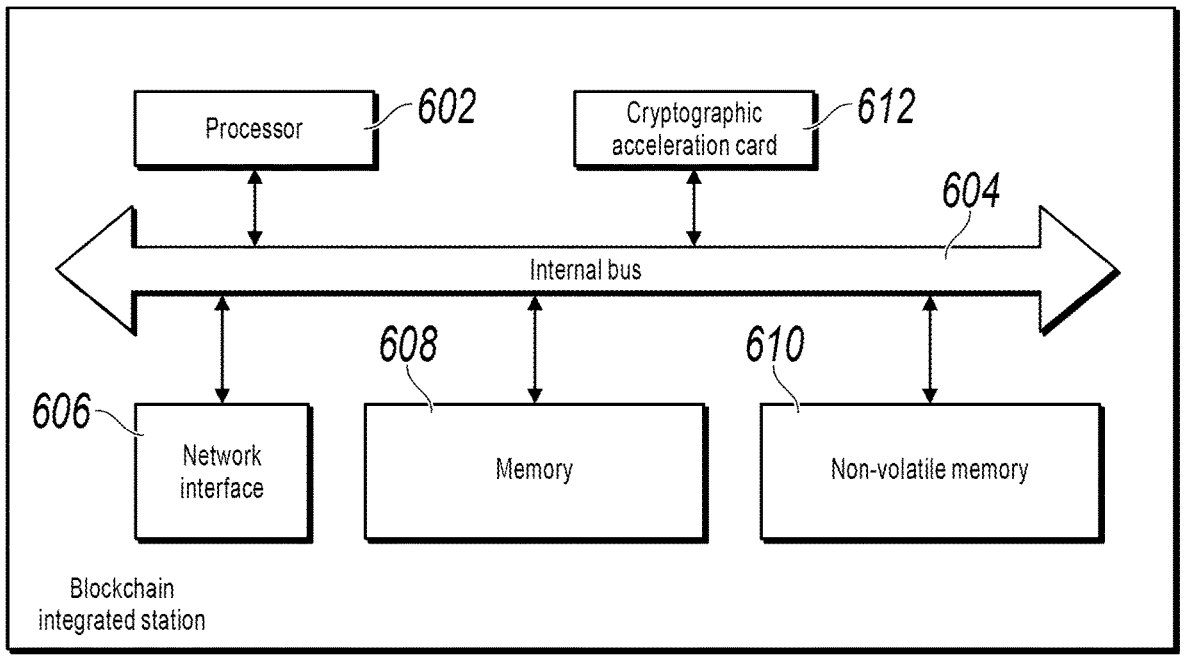
FIG. 6 is a structural schematic diagram of a blockchain integrated station according to example embodiments of the present disclosure.

FIG. 6 is a structural schematic diagram of a blockchain integrated station according to example embodiments of the present disclosure. As shown in FIG. 6, at the hardware level, the device includes a processor 602, an internal bus 604, a network interface 606, a memory 608, a non-volatile memory 610 and a cryptographic acceleration card 612. Of course, the device can further include hardware required for other services. The processor 602 reads corresponding computer programs from the non-volatile memory 610 to the memory 608 for running, so as to logically form various functional apparatuses of a blockchain integrated station. Of course, in addition to the software implementation, one or more embodiments of the present disclosure do not preclude other implementations, for example, logic device or a combination of software and hardware or the like. That is, the executing subject of the processing flows flow corresponding to various functional apparatuses is not limited to each logic unit and can also be hardware or logic device.

The systems, apparatuses, modules or units described in the above embodiments can be specifically implemented by a computer chip or an entity or can be implemented by a product with a particular function. A typical implementing device can be a computer and the computer can specifically be a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

In a typical configuration, the computer can include one or more central processing units (CPU), an input/output interface, a network interface and a memory.

The memory can include a non-permanent memory, a random access memory (RAM), and/or a non-volatile memory and the like in a computer readable medium, for example, read only memory (ROM), or flash RAM. The memory is one example of the computer readable medium.

The computer readable medium includes permanent, non-permanent, mobile and non-mobile media, which can realize information storage by any method or technology. The information can be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum memory, storage medium based on graphene, or other magnetic storage device or other non-transmission medium for storing information accessible by computing devices. According to the definition of the specification, the computer readable medium does not include transitory computer readable media, for example, modulated data signal and carriers.

It should be noted that the term "including", "containing" or any variation thereof is intended to encompass non-exclusive inclusion, so that a process, method, product or device including a series of elements includes not only those elements but also other elements not listed explicitly or those elements inherent to such a process, method, product or device. Without more limitations, an element defined by the statement "including a . . . " shall not be precluded to include additional same elements present in a process, method, product or device including the elements.

The specific embodiments are described as above. Other embodiments are within the scope of the appended claims. In some cases, the actions or steps recorded in the claims can be performed in a sequence different from the embodiments to achieve the desired result. Further, the processes shown in drawings do not necessarily require a particular sequence or a continuous sequence shown to achieve the desired result. In some embodiments, a multi-task processing and parallel processing is possible and may also be advantageous.

The terms used in one or more embodiments of the present disclosure are for the purpose of describing particular embodiments only, and are not intended to limit the one or more embodiments of the present disclosure. Terms "a", "the" and "said" used in their singular forms in one or more embodiments of the present disclosure and the appended claims are also intended to include plurality, unless clearly indicated otherwise in the context. It should also be understood that the term "and/or" as used herein refers to and includes any and all possible combinations of one or more of the associated listed items.

It is should be understood that, although the terms "first," "second," "third," and the like may be used in one or more embodiments of the present disclosure to describe various information, such information should not be limited to these terms. These terms are only used to distinguish one category of information from another. For example, without departing from the scope of one or more embodiments of the present disclosure, first information may be referred as second information; and similarly, the second information may also be referred as the first information. Depending on the context, the term "if" as used herein can be interpreted as "when" or "upon" or "in response to determining".

The above-mentioned disclosure is merely illustrative of preferred embodiments of one or more embodiments of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A cryptographic acceleration card of a blockchain integrated station comprising:
   at least one processor; and
   one or more memories coupled to the at least one processor and storing instructions for execution by the at least one processor, wherein the instructions when executed cause the cryptographic acceleration card to:
   generate, using an attribute unique to the blockchain integrated station that comprises the cryptographic acceleration card, an identity private key for the blockchain integrated station, wherein the blockchain integrated station further comprises a central processing unit (CPU) and a smart contract processing chip, wherein the attribute comprises hardware feature data of the blockchain integrated station, wherein the hardware feature data comprises unique data associated with process deviation in a manufacturing and packaging process of the blockchain integrated station, and wherein the blockchain integrated station comprises at least one intelligent network card, and the unique data associated with process deviation in the manufacturing and packaging process of the blockchain integrated station comprises unique data associated with process deviation in a manufacturing and packaging process of the smart contract processing chip or the intelligent network card comprised in the blockchain integrated station;

generate a private key ciphertext by encrypting the identity private key; and store the private key ciphertext in a data storage internal to the cryptographic acceleration card, wherein the cryptographic acceleration card is configured not to store the identity private key in the data storage and is further configured not to output the identity private key to a storage space external to the cryptographic acceleration card; and wherein the cryptographic acceleration card is configured to offload computation of the CPU or the smart contract processing chip of the blockchain integrated station by performing at least part of operations relating to key management, encryption and decryption, and signature verification of on the blockchain integrated station.

2. The cryptographic acceleration card of claim 1, wherein the hardware feature data comprises feature data of a master control chip comprised in the blockchain integrated station.

3. The cryptographic acceleration card of claim 1, at least one of:
wherein the instructions when executed cause the cryptographic acceleration card to:
in response to receiving a key generation request, collect the attribute; and
output the attribute; or
wherein the instructions when executed cause the cryptographic acceleration card to:
receive the attribute; and
output the attribute.

4. The cryptographic acceleration card of claim 1, wherein the instructions when executed cause the cryptographic acceleration card to:
in response to receiving an identity verification request, obtain the identity private key to decrypt the private key ciphertext; and
sign data using the identity private key.

5. The cryptographic acceleration card of claim 1, wherein the instructions when executed further cause the cryptographic acceleration card to output the private key ciphertext to the storage space external to the cryptographic acceleration card for storage.

6. The cryptographic acceleration card of claim 1, wherein the instructions when executed cause the cryptographic acceleration card to generate an identity public key using the attribute, and wherein the identity public key is used to verify a signature generated using the identity private key.

7. A computer-implemented method comprising:
generating, by a cryptographic acceleration card of a blockchain integrated station and using an attribute unique to the blockchain integrated station that comprises the cryptographic acceleration card, an identity private key for the blockchain integrated station, wherein the blockchain integrated station further comprises a central processing unit (CPU) and a smart contract processing chip, wherein the attribute comprises hardware feature data of the blockchain integrated station, wherein the hardware feature data comprises unique data associated with process deviation in a manufacturing and packaging process of the blockchain integrated station, and
wherein the blockchain integrated station comprises at least one intelligent network card, and the unique data associated with process deviation in the manufacturing and packaging process of the blockchain integrated station comprises unique data associated with process deviation in a manufacturing and packaging process of the smart contract processing chip or the intelligent network card comprised in the blockchain integrated station;

generating, by the cryptographic acceleration card, a private key ciphertext by encrypting the identity private key; and storing, by the cryptographic acceleration card, the private key ciphertext in a data storage internal to the cryptographic acceleration card, wherein the cryptographic acceleration card is configured not to store the identity private key in the data storage and is further configured not to output the identity private key to a storage space external to the cryptographic acceleration card;
and wherein the cryptographic acceleration card is configured to offload computation of the CPU or the smart contract processing chip of the blockchain integrated station by performing at least part of operations relating to key management, encryption and decryption, and signature verification of on the blockchain integrated station.

8. The computer-implemented method of claim 7, wherein the hardware feature data comprises feature data of a master control chip comprised in the blockchain integrated station.

9. The computer-implemented method of claim 7, comprising at least one of:
in response to receiving a key generation request, collecting the attribute, and outputting the attribute; or
receiving the attribute, and outputting the attribute.

10. The computer-implemented method of claim 7, comprising:
in response to receiving an identity verification request, obtaining the identity private key to decrypt the private key ciphertext; and
signing data using the identity private key.

11. The computer-implemented method of claim 7, further comprising:
outputting the private key ciphertext to the storage space external to the cryptographic acceleration card for storage.

12. The computer-implemented method of claim 7, comprising:
generating an identity public key using the attribute, wherein the identity public key is used to verify a signature generated using the identity private key.

13. A computer-implemented system comprising:
a blockchain integrated station; and
one or more computer memory devices coupled with the blockchain integrated station and having tangible, non-transitory, machine-readable media storing one or more instructions that, when executed by the blockchain integrated station, perform one or more operations comprising:
generating, by a cryptographic acceleration card of the blockchain integrated station and using an attribute unique to the blockchain integrated station that comprises the cryptographic acceleration card, an identity private key for the blockchain integrated station, wherein the blockchain integrated station further comprises a central processing unit (CPU) and a smart contract processing chip, wherein the attribute comprises hardware feature data of the blockchain integrated station, wherein the hardware feature data comprises unique data associated with process deviation in a manufacturing and packaging process of the blockchain integrated station,
and
wherein the blockchain integrated station comprises at least one intelligent network card, and the unique data associated with process deviation in the manufacturing and packaging process of the blockchain integrated station comprises unique data associated with process deviation in a manufacturing and packaging process of the smart contract processing chip or the intelligent network card comprised in the blockchain integrated station;

generating, by the cryptographic acceleration card, a private key ciphertext by encrypting the identity private key; and storing, by the cryptographic acceleration card, the private key ciphertext in a data storage internal to the cryptographic acceleration card, wherein the cryptographic acceleration card is configured not to store the identity private key in the data storage and is further configured not to output the identity private key to a storage space external to the cryptographic acceleration card;
and
wherein the cryptographic acceleration card is configured to offload computation of the CPU or the smart contract processing chip of the blockchain integrated station by performing at least part of operations relating to key management, encryption and decryption, and signature verification of on the blockchain integrated station.

14. The computer-implemented system of claim 13, wherein the hardware feature data comprises feature data of a master control chip comprised in the blockchain integrated station.

15. The computer-implemented system of claim 13, the operations comprising at least one of:
in response to receiving a key generation request, collecting the attribute, and outputting the attribute; or
receiving the attribute, and outputting the attribute.

16. The computer-implemented system of claim 13, the operations comprising:
in response to receiving an identity verification request, obtaining the identity private key to decrypt the private key ciphertext; and
signing data using the identity private key.

17. The cryptographic acceleration card of claim 1, wherein the data storage internal to the cryptographic acceleration card comprise a one time programmable (OTP) memory that is allowed to be programmed only once.

18. The computer-implemented method of claim 7, wherein the data storage internal to the cryptographic acceleration card comprise a one time programmable (OTP) memory that is allowed to be programmed only once.

19. The computer-implemented system of claim 13, wherein the data storage internal to the cryptographic acceleration card comprise a one time programmable (OTP) memory that is allowed to be programmed only once.

* * * * *